United States Patent
Puthuvana Vinod et al.

(10) Patent No.: US 12,399,465 B2
(45) Date of Patent: Aug. 26, 2025

(54) SYSTEM AND METHOD FOR CONTROLLING AN OPERATION OF A SYSTEM SUBJECT TO AN UNCERTAINTY

(71) Applicant: Mitsubishi Electric Research Laboratories, Inc., Cambridge, MA (US)

(72) Inventors: Abraham Puthuvana Vinod, Cambridge, MA (US); Stefano Di Cairano, Newton, MA (US)

(73) Assignee: Mitsubishi Electric Research Laboratories, Inc.

( * ) Notice: Subject to any disclaimer, the term of this patent is extended or adjusted under 35 U.S.C. 154(b) by 413 days.

(21) Appl. No.: 18/167,730

(22) Filed: Feb. 10, 2023

(65) Prior Publication Data
US 2024/0272591 A1  Aug. 15, 2024

(51) Int. Cl.
*G05B 13/02* (2006.01)
*G05B 13/04* (2006.01)

(52) U.S. Cl.
CPC .......... *G05B 13/021* (2013.01); *G05B 13/04* (2013.01); *G05B 13/042* (2013.01)

(58) Field of Classification Search
CPC .... G05B 13/04; G05B 13/042; G05B 13/048; G05B 13/021
USPC ........................................................ 700/28
See application file for complete search history.

(56) References Cited

U.S. PATENT DOCUMENTS

| | | | | |
|---|---|---|---|---|
| 7,248,998 B2* | 7/2007 | De Martini | | G05B 19/41875 |
| | | | | 702/182 |
| 2005/0288892 A1* | 12/2005 | Martini | | G05B 19/41875 |
| | | | | 702/179 |

FOREIGN PATENT DOCUMENTS

| | | | | |
|---|---|---|---|---|
| DE | 102018201411 A1 * | 8/2019 | ............ | G05B 17/02 |
| FR | 2862793 A1 * | 5/2005 | ............ | G05B 17/02 |

OTHER PUBLICATIONS

Peña-Ordieres, Alejandra, James R. Luedtke, and Andreas Wachter. "Solving chance-constrained problems via a smooth sample-based nonlinear approximation." SIAM Journal on Optimization 30.3 (2020): 2221-2250.

\* cited by examiner

*Primary Examiner* — Ronald D Hartman, Jr.
(74) *Attorney, Agent, or Firm* — Gene Vinokur

(57) ABSTRACT

The present disclosure discloses a system and a method for controlling an operation of a system subject to an uncertainty of an operation variable of the system. The method comprises collecting a number of samples of the uncertainty of the operation variable, constructing, based on the collected samples, an empirical quantile function associated with the uncertainty of the operation variable, determining confidence bounds on the empirical quantile function to bound an approximation error between the empirical quantile function and a true quantile function, determining an uncertainty set based on the empirical quantile function bounded by the confidence bounds, reformulating, based on the uncertainty set, a chance constraint into a deterministic constraint, solving an optimal control problem subject to the deterministic constraint to produce one or more control commands to one or more actuators of the system, and controlling the operation of the system based on the control commands.

20 Claims, 15 Drawing Sheets

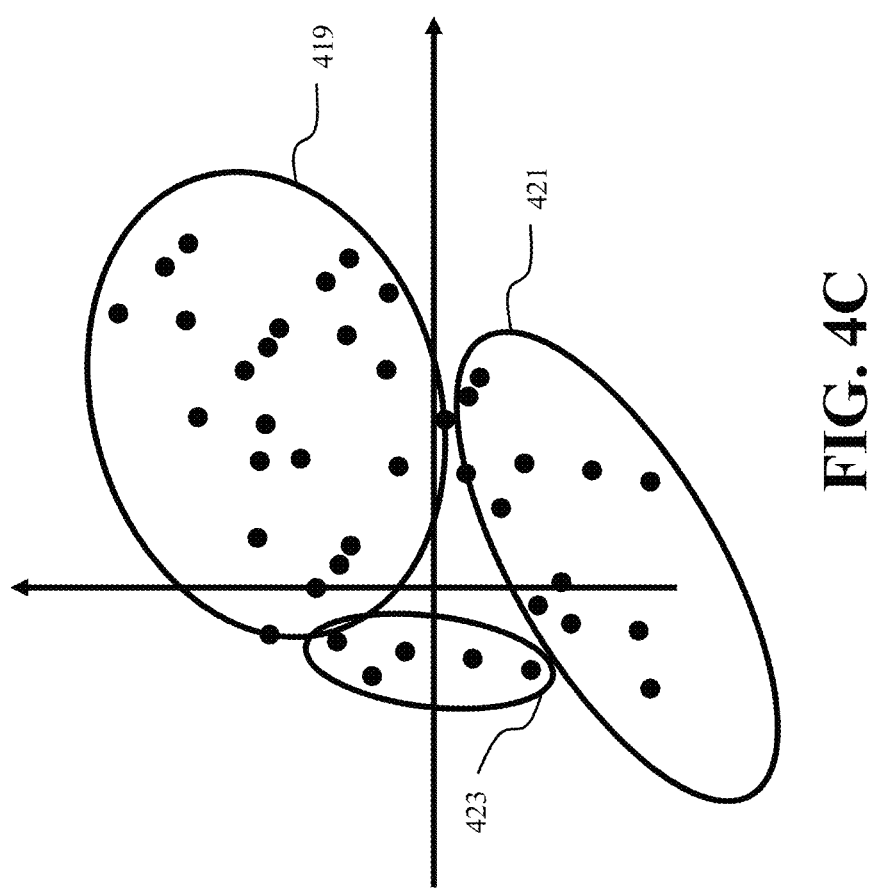

SYSTEM AND METHOD FOR CONTROLLING AN OPERATION OF A SYSTEM SUBJECT TO AN UNCERTAINTY

TECHNICAL FIELD

The present disclosure relates generally to control systems, and more particularly to a system and a method for controlling an operation of a system subject to an uncertainty of an operation variable of the system.

BACKGROUND

Motion planning for an autonomous device (e.g., autonomous vehicle) uses optimization to deal with a task of minimizing a performance metric subject to constraints arising from dynamics, actuator limitations, and environmental limitations. The autonomous device faces uncertainty from physics of the autonomous device and environment, sensor limitations, and simplifications to the utilized mathematical models for the sake of tractability. Optimization under the uncertainty is handled using a chance-constrained optimization method. In the chance-constrained optimization method, the uncertainty in the optimization is accounted by that the constraints be satisfied with a certain probability, i.e., by formulating chance constraints that allow for a specified, yet non-zero, probability of constraint violation. However, the chance constraints are computationally intractable and require an approximate formulation.

To mitigate such a problem, the chance-constrained optimization method is reformulated as a deterministic optimization method having deterministic constraints guaranteeing the satisfaction of the chance constraints. To achieve such a reformulation, some approaches assume structure on the uncertainty or a constraint set $f \leq 0$. For example, the uncertainty is assumed to be Gaussian and a constraint set is a hyperplane, or the uncertainty has known mean and covariance and the constraint set is affine in the uncertainty. Such reformulations are often conservative in practice.

Further, data-driven approaches for the reformulation use a notion of scenarios and pose the chance constraint as a collection of a finite number of constraints evaluated at data points available for the uncertainty. However, the data-driven approaches require a convex f, restricting a class of functions of considered. Alternatively, the data-driven approaches utilize a mixed-integer formulation that can cause severe numerical challenges in implementation, or solve a collection of separate scenario problems that require significant computational resources.

Therefore, there is a need for a system and method for solving a chance constrained optimization problem to optimize the motion trajectory for the autonomous device subject to the uncertainty, where the uncertainty is unknown.

SUMMARY

It is an objective of some embodiments to solve a chance constrained optimization problem using data and without relying on any structural assumptions on the uncertainty. In particular, it is an objective of some embodiments to solve a constrained optimization problem to optimize a motion trajectory under constraints for a system subject to uncertainty, where the uncertainty is unknown and is estimated using data collected during present and possibly past operation of the device.

Examples of the system include autonomous ground vehicles, such as cars or robots in factory automation, an aircraft on airport surfaces, and unmanned aerial vehicles such as drones for infrastructure monitoring or inspections. Examples of the constraints include steering the system to always stay within operation bounds, steering the system to eventually reach a desired region, and keeping a safe distance from obstacles in an environment. The uncertainty in these applications arise from uncertainty due to unmodelled phenomena in the environment and mathematical models used during control, e.g., friction effects on the autonomous ground vehicles and wind effects on flight of the unmanned aerial vehicles. Additionally, the uncertainty can also arise from limitations of sensors in sensing the environment.

According to an embodiment, a chance constraint may be given as $\mathbb{P}_w\{f(z,w) \leq a\} \geq \delta$. Here, f encodes the constraint that a decision variable z must lie outside a set $f(z,w) \leq 0$. However, w is an unknown uncertainty whose value is not known, therefore a value of the decision variable z is chosen such that a likelihood of satisfaction of the constraint $f(z,w) \leq 0$ is above a user-specified risk threshold $\delta$ (say 0.999). Existing literature enforces the chance constraint $\mathbb{P}_w\{f(z,w) \leq a\} \geq \delta$ by utilizing distribution or moments (mean and covariance) of w to approximate a likelihood of a chosen value of the decision variable z satisfies the constraint $f(z,w) \leq 0$. Some embodiments are based on the realization that the chance constraint can be enforced using samples of w and without requiring prior knowledge of the distribution or the moments of w. Some embodiments are based on the realization that the chance constraint can be decomposed into requiring that the uncertainty lie in a particular uncertainty set independent of the decision variable, and then the decision variable is optimized while maintaining constraint satisfaction for all values of the uncertainty in the uncertainty set. The uncertainty set can be determined using empirical quantile functions for the user-specified risk threshold $\delta$, and computation of the decision variable while maintaining constraint satisfaction for all values of the uncertainty can be achieved via a robust optimization. Hence, the embodiments of the present disclosure are based on the realization that a combination of the empirical quantile functions and the robust optimization can compute optimal motion trajectories for the system subject to the uncertainty, where the uncertainty is unknown and can be estimated using the data collected during the present and/or possibly past operation of the system. Such an approach is described below.

For the purpose of the explanation, a vehicle is considered to be the system subject to uncertainty. The vehicle may be an autonomous vehicle or a semi-autonomous vehicle. At first, a number of samples of an uncertainty of an operation variable of the vehicle are collected. For instance, in collision avoidance example, the operation variable of the vehicle may correspond to a bounding box position around an obstacle and a number of samples of uncertainty in the bounding box position are collected.

Further, based on the collected samples, an empirical quantile function associated with the uncertainty of the operation variable is constructed. The quantile function is an inverse of a cumulative distribution function. The cumulative distribution function of a real-valued random variable w, denoted by $\Phi_w(w)$, is a probability that w will take a value less than or equal to w. The empirical quantile function approximates a true quantile function of the uncertainty w, since the true quantile function is not available to a user. However, the quantile functions approximated using the samples are noisy. To mitigate such a problem, some embodiments use a property of the quantile functions that enable finite samples guarantee on a quality of approximation.

To that end, confidence bounds on the empirical quantile function are determined to bound an approximation error between the empirical quantile function and the true quantile function. In an embodiment, Dvoretzky-Kiefer-Wolfowitz-Massart inequality is used to bound the approximation error between the empirical quantile function and the true quantile function using only a finite number of samples. Further, based on the empirical quantile function bounded by the confidence bounds and the user-specified risk threshold $\delta$, an uncertainty set $\varepsilon$ is computed. The uncertainty set E includes a subset of values attainable by the uncertainty w.

Further, using the uncertainty set $\varepsilon$, the chance constraint is reformulated into a deterministic constraint $\max_{w \in \varepsilon} f(z,w) \leq 0$. Some embodiments are based on the recognition that any value of the decision variable that satisfies deterministic constraint $\max_{w \in \varepsilon} f(z,w) \leq 0$ satisfies the chance constraint $\mathbb{P}_w\{f(z,w) \leq a\} \geq \delta$. In the deterministic constraint $\max_{w \in \varepsilon} f(z,w) \leq 0$, the maximization operation encodes a requirement that all uncertainty values within the uncertainty set $\varepsilon$ must satisfy the constraint $f(z,w) \leq 0$. Additionally, the deterministic constraint $\max_{w \in \varepsilon} f(z,w) \leq 0$ does not impose any structure or assumptions on the uncertainty w or constraint function f.

Additionally, in some embodiments, the deterministic constraint $\max_{w \in \varepsilon} f(z,w) \leq 0$ is equivalently expressed as $g(z) = \max_{w \in \varepsilon} f(z,w) \leq 0$, which can be easily implemented in standard off-the-shelf optimization solvers and provides guarantees of satisfaction of the chance constraint. Additionally, $g(z)$ is known to be convex when f is convex in z for every value of $w \in \varepsilon$ and $\varepsilon$ is convex. Convexity of $g(z)$ provides numerical and theoretical benefits when enforcing (1) in an optimal control problem.

Further, an optimal control problem subject to the deterministic constraint is solved to produce one or more control commands to one or more actuators of the vehicle, such as a steering wheel and/or brakes of the vehicle. Furthermore, the vehicle is controlled based on the control commands to the one or more actuators.

Accordingly, one embodiment discloses a controller for controlling an operation of a system subject to an uncertainty of an operation variable of the system. The controller comprises at least one processor; and a non-transitory memory having instructions stored thereon that, when executed by the at least one processor, cause the feedback controller to: collect a number of samples of the uncertainty of the operation variable; construct, based on the collected samples, an empirical quantile function associated with the uncertainty of the operation variable; determine confidence bounds on the empirical quantile function to bound an approximation error between the empirical quantile function and a true quantile function; determine an uncertainty set based on the empirical quantile function bounded by the confidence bounds and a user-specified risk threshold; reformulate, based on the uncertainty set, a chance constraint into a deterministic constraint; solve an optimal control problem subject to the deterministic constraint to produce one or more control commands to one or more actuators of the system; and control the operation of the system based on the control commands to the one or more actuators of the system.

Accordingly, another embodiment discloses a method for controlling an operation of a system subject to an uncertainty of an operation variable of the system. The method comprises collecting a number of samples of the uncertainty of the operation variable; constructing, based on the collected samples, an empirical quantile function associated with the uncertainty of the operation variable; determining confidence bounds on the empirical quantile function to bound an approximation error between the empirical quantile function and a true quantile function; determining an uncertainty set based on the empirical quantile function bounded by the confidence bounds and a user-specified risk threshold; reformulating, based on the uncertainty set, a chance constraint into a deterministic constraint; solving an optimal control problem subject to the deterministic constraint to produce one or more control commands to one or more actuators of the system; and controlling the operation of the system based on the control commands to the one or more actuators of the system.

Accordingly, yet another embodiment discloses a non-transitory computer-readable storage medium embodied thereon a program executable by a processor for performing a method for controlling an operation of a system subject to an uncertainty of an operation variable of the system. The method comprises collecting a number of samples of the uncertainty of the operation variable; constructing, based on the collected samples, an empirical quantile function associated with the uncertainty of the operation variable; determining confidence bounds on the empirical quantile function to bound an approximation error between the empirical quantile function and a true quantile function; determining an uncertainty set based on the empirical quantile function bounded by the confidence bounds and a user-specified risk threshold; reformulating, based on the uncertainty set, a chance constraint into a deterministic constraint; solving an optimal control problem subject to the deterministic constraint to produce one or more control commands to one or more actuators of the system; and controlling the operation of the system based on the control commands to the one or more actuators of the system.

BRIEF DESCRIPTION OF THE DRAWINGS

FIG. 4C illustrates determination of the uncertainty set using a union of ellipsoids, according to some embodiments of the present disclosure.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
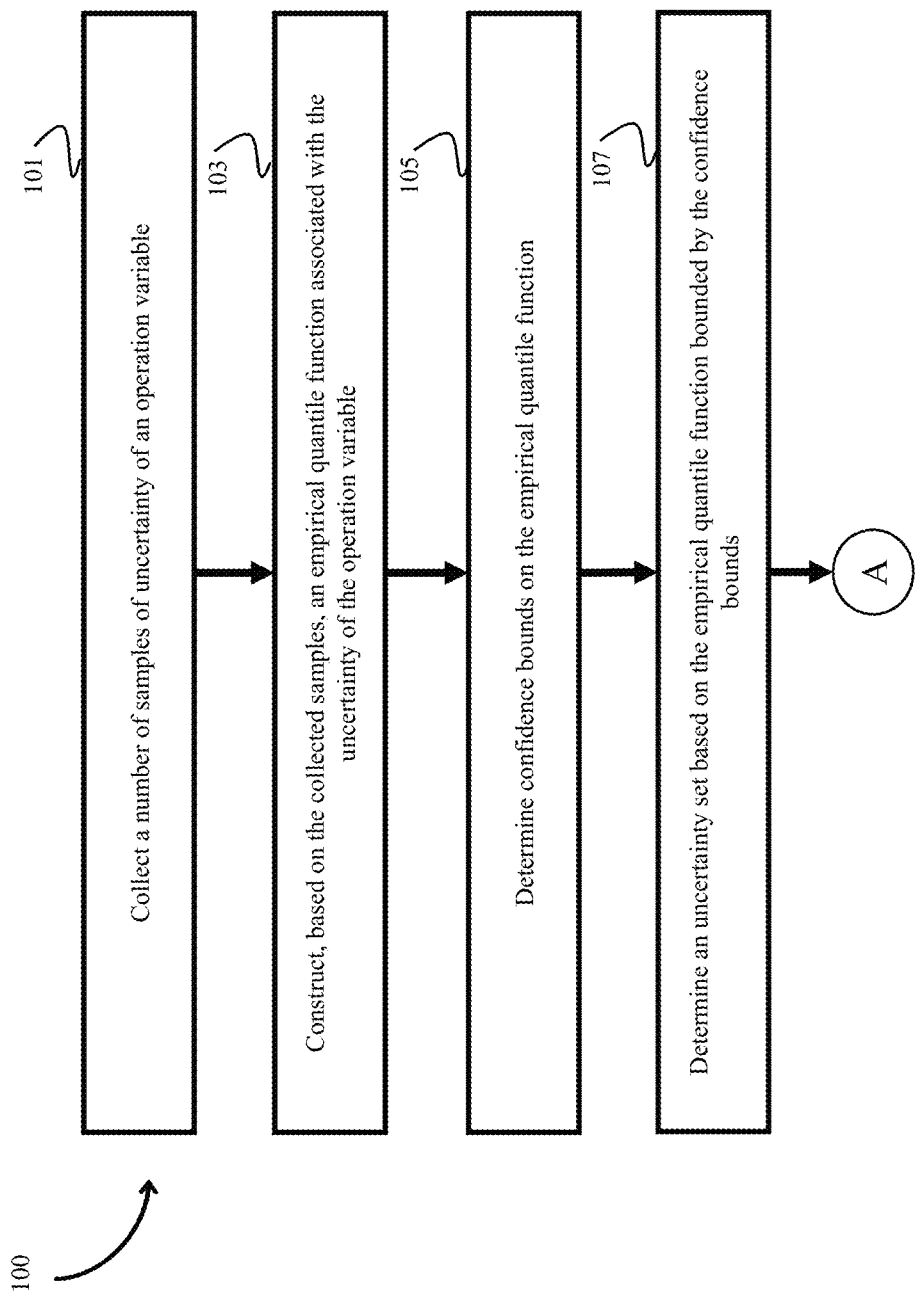
FIG. 1A shows a block diagram for controlling an operation of a vehicle subject to uncertainty, according to some embodiments of the present disclosure.
Figure 1A:
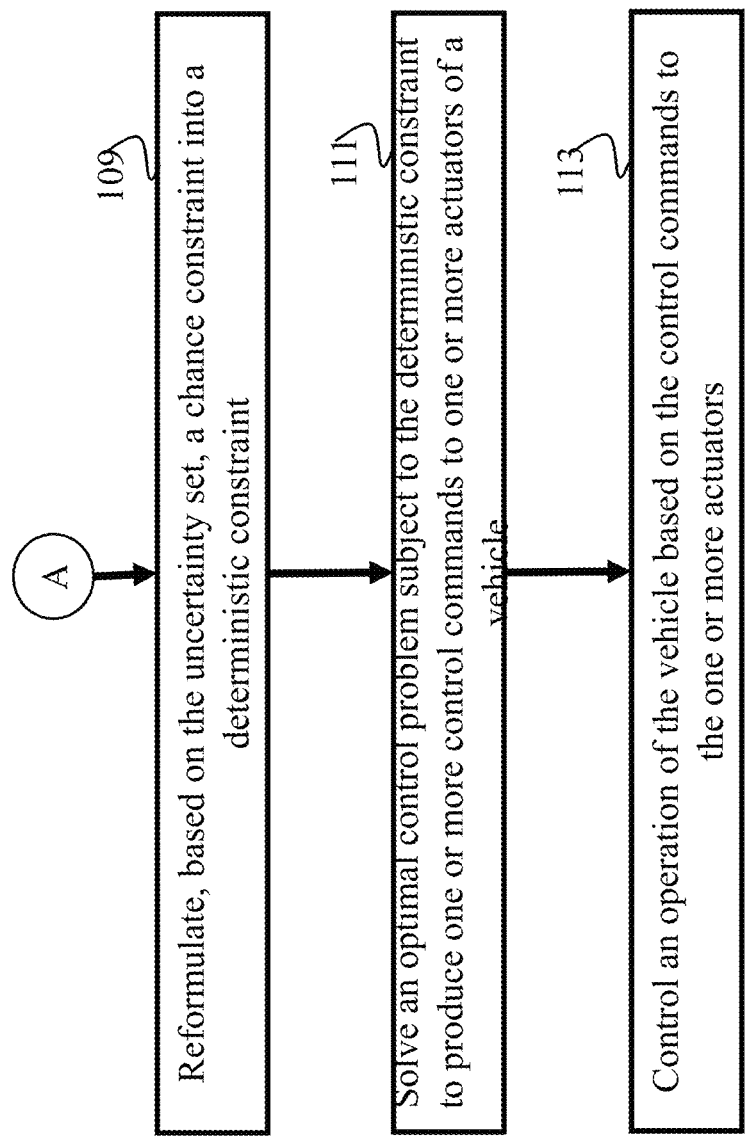

FIG. 1A shows a block diagram 100 of a method for controlling a system, according to some embodiments of the present disclosure. Examples of the system include autonomous ground vehicles, such as cars or robots in factory automation, an aircraft on airport surfaces, and unmanned aerial vehicles such as drones for infrastructure monitoring or inspections. For the purpose of the explanation, a vehicle is considered to be the system that has to be controlled. The vehicle may be an autonomous vehicle or a semi-autonomous vehicle. The vehicle may be subject to uncertainty. The uncertainty may arise due to unmodelled phenomena in an environment in which the vehicle is operated and mathematical models used during control, e.g., friction effects on the vehicles. Additionally, the uncertainty can also arise from limitations of sensors in sensing the environment. The uncertainty arising in an autonomous driving scenario of the vehicle is explained below in FIG. 1B.

Figure 1B:
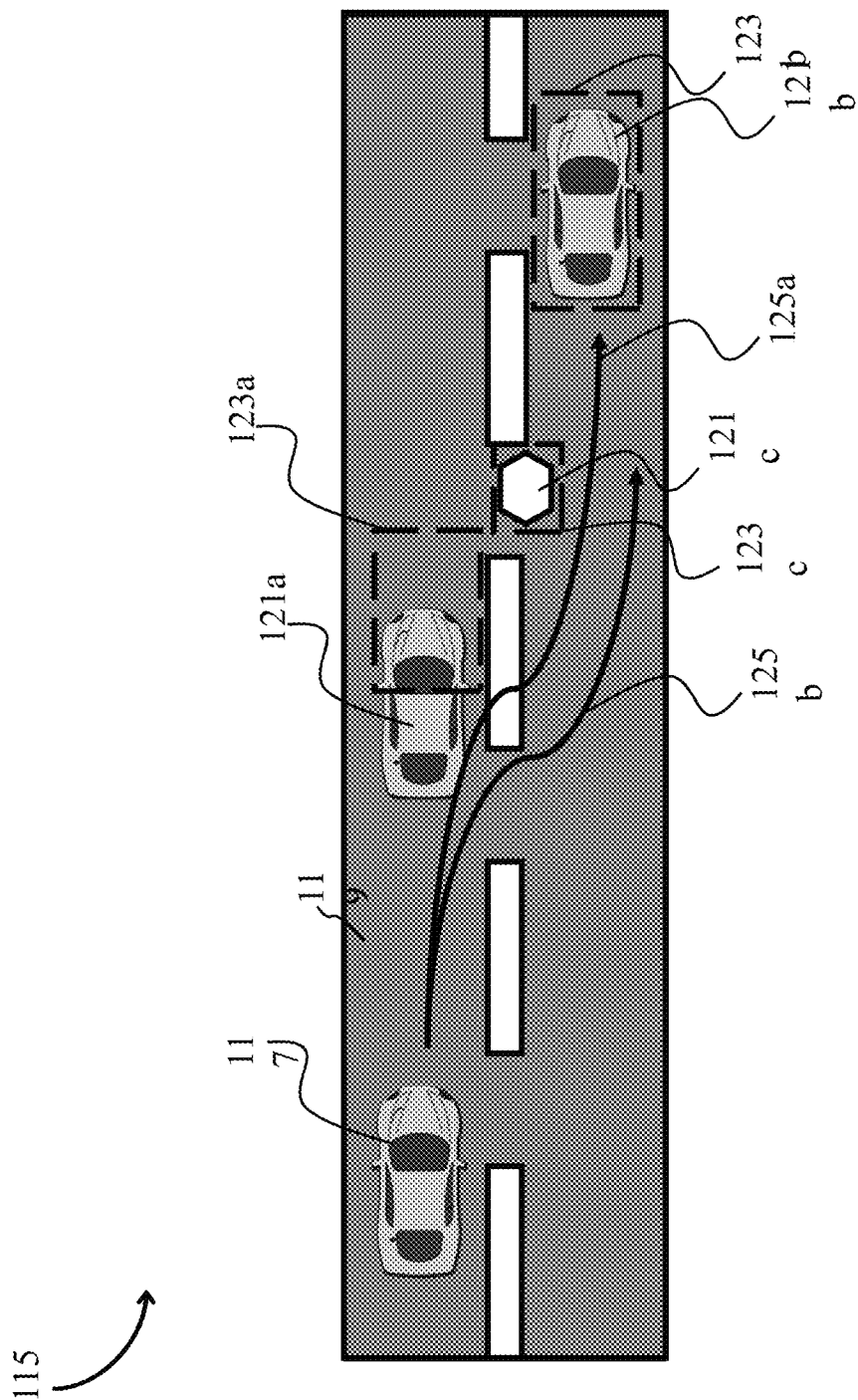
FIG. 1B illustrates a typical autonomous driving scenario, according to some embodiments of the present disclosure.

FIG. 1B illustrates a typical autonomous driving scenario 115, according to some embodiments of the present disclosure. A vehicle 117 to be controlled is moving on a road 119. The vehicle 117 is communicatively coupled to a controller. In some embodiments, the controller is embedded into the vehicle 117. In addition to the vehicle 117, multiple uncontrolled cars, such as, a car 121a and a car 121b (which are collectively referred to hereinafter as the multiple uncontrolled cars 121a and 121b), are moving on the road 119. The multiple uncontrolled cars 121a and 121b act as moving obstacles for the vehicle 117. Further, a foreign object, e.g., a large stone 121c acts as a static obstacle for the vehicle 117. Hereinafter, the multiple uncontrolled cars 121a and 121b, and the large stone 121c are collectively referred to as the obstacles 121a, 121b, and 121c.

The vehicle 117 may include sensors to sense surrounding environment. Examples of the sensors include distance range finders, radars, lidars, and cameras. Additionally, the vehicle 117 may include sensors, such as, global positioning system (GPS), accelerometers, inertial measurement units, gyroscopes, shaft rotational sensors, torque sensors, deflection sensors, pressure sensor, and flow sensors, to sense its current motion quantities and internal status.

The controller collects data from the sensors of the vehicle 117 and determines bounding boxes, such as a bounding box 123a, a bounding box 123b, and a bounding box 123c (which are collectively referred to hereinafter as the bounding boxes 123a, 123b, and 123c), around the obstacles 121a, 121b, and 121c, respectively, based on the collected data. Further, a motion trajectory 125a for the vehicle 117 may be determined based on the bounding boxes 123a, 123b, and 123c. However, due to sensing limitations of the sensors and processing limitations, the bounding boxes 123a, 123b, and 123c may not always be correct. For example, the bounding box 123a partially lies outside the vehicle 121a. Since the bounding boxes 123a, 123b, and 123c may be incorrect, the motion trajectory 125a is susceptible to collision with any of the obstacles 121a, 121b, and 121c. To that end, it is desirable to determine a motion trajectory 125b that provides sufficient margins from the obstacles 121a, 121b, and 121c, accounting for uncertainty of the bounding boxes 123a, 123b, and 123c.

Further, in some embodiments, the operation of the vehicle 117 is subject to constraints, for example, drive the vehicle 117 within speed limits. Due to unpredictability of conditions of the road 119, it is not practical to drive the vehicle 117 at the speed limit. The speed limits may be violated due to uncertainty in friction of tires of the vehicle 117.

According to some embodiments, the constraints under uncertainty can be cast as a chance constraint, i.e., a constraint which must hold with likelihood greater than a user-specified risk threshold. For example, the chance constraint may be given as $$\mathbb{P}_w\{f(z, w) \leq 0\} \geq \delta. \quad (1)$$

Here, function f encodes the constraint that a decision variable z must lie outside a set $f(z,w) \leq 0$. However, w is an unknown uncertainty whose value is not known, therefore a value of the decision variable z is chosen such that a likelihood of satisfaction of the constraint $f(z,w) \leq 0$ is above a user-specified risk threshold $\delta$ (say 0.999). In other words, the chance constraint constraints a probability of a nonlinear function (e.g., function f) of the decision variable be nonpositive with a user-specified risk threshold $\delta$. The nonlinear function is one of a non-convex and a polynomial.

As an example, consider a constraint that the vehicle 117 should not collide with the vehicle 121a is written in the form of (1). Here, an uncertainty is associated with a two-dimensional position of the bounding box 123a. Specifically, the bounding box 123a around the vehicle 121a is uncertain. For the collision avoidance constraint of the form (1), z is a two-dimensional position of the vehicle 117 in (x,y)-coordinate system, w is a two-dimensional position of the bounding box 123a in (x,y)-coordinate system, and $$f(z, w) = 1 - \max_{i \in \{1,2\}}((z_i - w_i)/a_i)$$

is a constraint which is positive if and only if position of the vehicle 117 does not lie in the bounding box 123a. Here, $Z_1$ is the position of the vehicle 117 in x-coordinate, $Z_2$ is the position of the vehicle 117 in y-coordinate, $a_1$ is a length of the bounding box along the x-coordinate, and $a_2$ is a length of the bounding box along the y-coordinate.

However, incorporating the constraints of the form (1) in an optimal control problem is challenging as the chance constraints are computationally intractable and require an approximate formulation. Existing literature enforces the chance constraint $\mathbb{P}_w\{f(z,w) \leq a\} \geq \delta$ by utilizing distribution or moments (mean and covariance) of w to approximate a likelihood of a chosen value of the decision variable z satisfies the constraint $f(z,w) \leq 0$. Some embodiments are based on the realization that the chance constraint can be enforced using samples of w and without requiring prior knowledge of the distribution or the moments of w. Some embodiments are based on the realization that the chance constraint can be decomposed into requiring that the uncertainty lie in a particular uncertainty set independent of the decision variable, and then the decision variable is optimized while maintaining constraint satisfaction for all values of the uncertainty in the uncertainty set. The uncertainty set can be determined using empirical quantile functions bounded by confidence bounds and the user-specified risk threshold δ, and the computation of the decision variable while maintaining constraint satisfaction for all values of the uncertainty in the uncertainty set can be achieved via a robust optimization.

Hence, the embodiments of the present disclosure are based on the realization that a combination of the empirical quantile functions and the robust optimization can compute optimal motion trajectories for the vehicle 117 subject to the uncertainty, where the uncertainty is unknown and can be estimated using the data collected during the present and/or possibly past operation of the vehicle 117. Such an approach is described below with reference to FIG. 1A.

Referring to FIG. 1A, at block 101, a number of samples of an uncertainty of an operation variable of the vehicle 117 is collected. For instance, in collision avoidance example, a number of samples of uncertainty in the bounding box position is collected. The samples may be determined offline (i.e., before real-time operation) or during real-time control of the vehicle 117.

The quantile function $Q_w$ is the inverse of a cumulative distribution function. The cumulative distribution function of a real-valued random variable w, denoted by $\Phi_w(v)$, is a probability that w takes a value less than or equal to v.

At block 103, based on the collected samples, an empirical quantile function associated with the uncertainty of the operation variable is constructed. Given a set of M data samples $\mathcal{W} = \{w_{sample}^{(1)}, w_{sample}^{(2)}, \ldots w_{sample}^{(M)}\}$, the empirical quantile function associated with the uncertainty w can be given as $$\hat{Q}_w^M(p) = \inf\left\{w \in \mathbb{R} : \hat{\Phi}_w^M(w) \geq p\right\}, \quad (2)$$

where $\hat{\Phi}_w^M(w)$ is an empirical cumulative distribution of the uncertainty w, $$\hat{\Phi}_w^M(w) = \frac{1}{M}\sum_{j=1}^{M} \mathbb{I}\{w_{sample}^{(j)} \leq w\}, \quad (3)$$

and $\mathbb{I}\{w_{sample}^{(j)} \leq w\} = 1$ when $w_{sample}^{(j)} \leq w$, and zero otherwise.

The empirical quantile function (2) approximates a true quantile function $Q_w$ of the uncertainty w, since $Q_w$ is not available to the user.

Figure 1C:
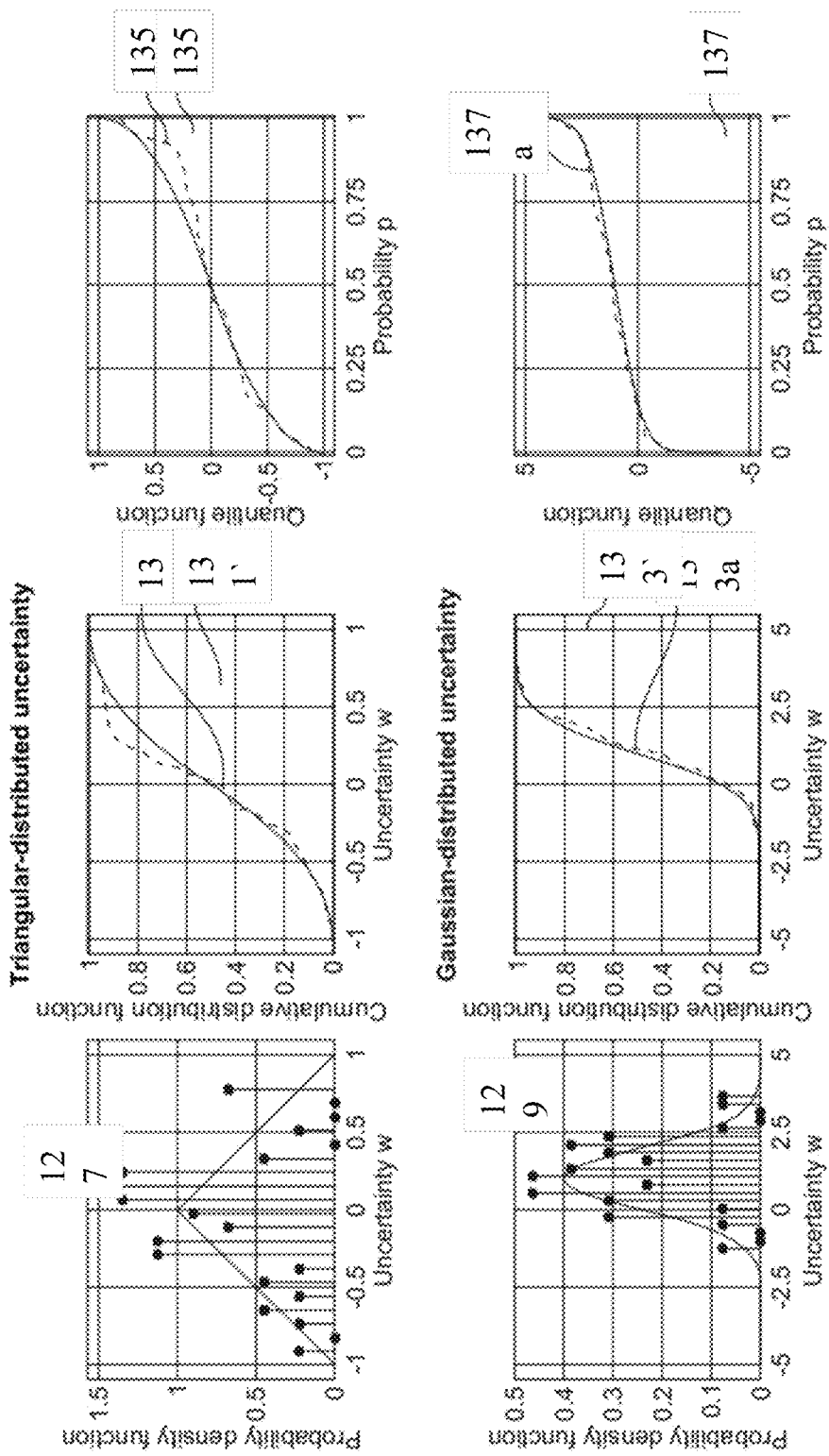
FIG. 1C illustrates true probability density functions, true cumulative distributions, true quantile distributions, and their data-driven counterparts, according to some embodiments of the present disclosure.

FIG. 1C illustrates true probability density functions (such as, a true probability density function 127 and a true probability density function 129), true cumulative distributions (such as, a true cumulative distribution 131 and a true cumulative distributions 133), true quantile distributions (such as, a true cumulative distributions 135 and a true cumulative distributions 137), along with their empirical counterparts constructed using a finite set of samples for two distributions, namely, a symmetric triangular distribution and a Gaussian random variable. The symmetric triangular distribution has a support of [−1, 1] as can be observed from the true probability density function 127 and the true cumulative distribution 131, while the Gaussian random variable has a support of an entire real line as can be observed from the true probability density function 129 and the true cumulative distribution 133.

A dotted line 131a and a dotted line 133a represent empirical cumulative distributions, and a dotted line 135a and a dotted line 137a represent empirical quantile functions constructed using (2) and (3) with the collected samples. It can be observed from FIG. 1C that a domain of the true probability density function, the true cumulative distribution, and the empirical cumulative distribution match the support of the uncertainty. Ranges of the true cumulative distribution and the empirical cumulative distribution functions match and are equal to [0, 1]. On the other hand, a domain of the true quantile function and the empirical quantile function (e.g., empirical quantile function represented by the dotted line 137a) match and are equal to [0,1]. The ranges of the true quantile function and the empirical quantile function match the support of the uncertainty.

However, the quantile functions approximated using the samples are noisy. To mitigate such a problem, some embodiments use a property of the quantile functions that enable finite samples guarantee on a quality of approximation.

To that end, referring to FIG. 1A, at block 105, confidence bounds on the empirical quantile function to bound an approximation error between the empirical quantile function and the true quantile function, are determined. In an embodiment, Dvoretzky-Kiefer-Wolfowitz-Massart inequality is used to bound the approximation error between the empirical quantile function and the true quantile function using only a finite number of samples. Specifically, the empirical quantile function associated with the uncertainty w, when defined using a set of M samples $\mathcal{W} = \{w_{sample}^{(1)}, w_{sample}^{(2)}, \ldots w_{sample}^{(M)}\}$ sample has the following approximation guarantee:

$$\max_{p\in[0,1]} \mathbb{P}\left\{\left|Q_w(p) - \hat{Q}_w^M(p)\right| > \epsilon\right\} \le 2e^{-2M\epsilon^2}. \quad (4)$$

Equation (4) implies that for all possible values of the uncertainty w, the maximum deviation between the true quantile function $Q_w(p)$ and the empirical quantile function $\hat{Q}_w^M(p)$ is bounded from above by e with a high probability as M increases, where M is the number of samples used to construct the empirical quantile function $\hat{Q}_w^M$. Right hand side (RHS) of (4) shrinks to zero as M increases implying that a probability of an event $|Q_w(p)-\hat{Q}_w^M(p)|>\epsilon$ vanishes as M increases.

Given a small probability of failure β, it is observed that RHS of (4) is smaller than β when $$\epsilon \ge \sqrt{\frac{\log\left(\frac{1}{\beta}\right)}{2M}}.$$

Consequently, the confidence bounds on the unknown quantile function $Q_w$ are determined using the empirical quantile function $\hat{Q}_w^M$, as $$\hat{Q}_w^M(p) - \sqrt{\frac{\log\left(\frac{1}{\beta}\right)}{2M}} \le Q_w(p) \le \hat{Q}_w^M(p) + \sqrt{\frac{\log\left(\frac{1}{\beta}\right)}{2M}}, \quad (5)$$

where (5) holds with probability 1−β for any choice of sample count M>0. Equation (5) shows that high-probability confidence bounds can be constructed around the true quantile function $Q_w$ using the empirical quantile function $\hat{Q}_w^M$.

Figure 1D:
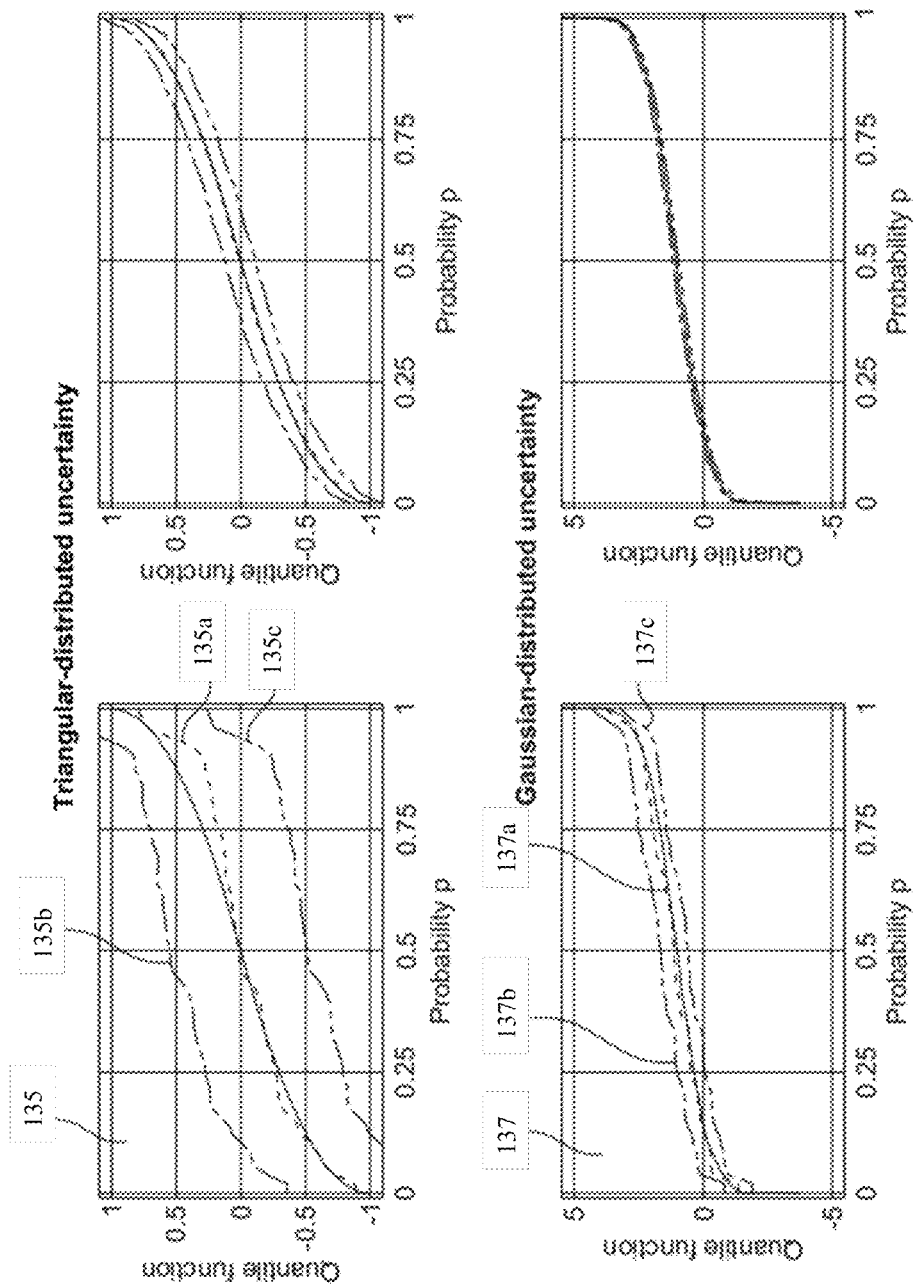
FIG. 1D illustrates confidence bounds on an empirical quantile function, according to some embodiments of the present disclosure.

FIG. 1D illustrates a confidence bound 135b and a confidence bound 135c on the empirical quantile function 135a, and a confidence bound 137b and a confidence bound 137c on the empirical quantile function 137a for M=50 and M=1000 samples, respectively, according to some embodiments of the present disclosure. It is evident from FIG. 1D that the confidence bounds tighten when the number of samples M is high.

Referring back to FIG. 1A, at block 107, an uncertainty set ε is determined based on the empirical quantile function bounded by the confidence bounds and the user-specified risk threshold δ, such that probability $\mathbb{P}\{w\in\varepsilon\}\ge\delta$. The uncertainty set ε includes a subset of values attainable by the uncertainty w. When the uncertainty set ε covers the entire set of values attainable by the uncertainty w, $\mathbb{P}\{w\in\varepsilon\}=1$.

At block 109, using the uncertainty set ε, the chance constraint (1) is reformulated into a deterministic constraint $$\max_{w\in\varepsilon} f(z, w) \le 0. \quad (6)$$

Some embodiments are based on the recognition that any value of the decision variable that satisfies (6) satisfies the chance constraint (1). In (6), the maximization operation encodes a requirement that all uncertainty values within the uncertainty set ε must satisfy the constraint f(z,w)≤0. Additionally, (6) does not impose any structure or assumptions on the uncertainty w or constraint function f.

However, chance constrained optimization problems where the chance constraints are replaced with deterministic constraints of the form (6) lead to a bilevel optimization problem, and are typically hard to solve. The bilevel optimization problems are optimization problems where the constraints themselves involve solving one or more optimization problems.

Some embodiments are based on the observation that for some special cases of the constraint function f and the uncertainty set ε, (6) can be equivalently expressed as $$g(z) = \max_{w\in\varepsilon} f(z, w) \le 0. \quad (7)$$

Unlike with (6), optimization problems with deterministic constraints of the form (7) can be easily implemented in standard off-the-shelf solvers and provides guarantees of satisfaction of the chance constraint (1). Additionally, g in (7) is known to be convex when f is convex in z for every value of w∈ ε and ε is convex. Convexity of g in (7) provides numerical and theoretical benefits when enforcing (1) in an optimal control problem.

At block 111, an optimal control problem subject to the deterministic constraint (6) or (7) is solved to produce one or more control commands to one or more actuators of the vehicle 117, such as a steering wheel and/or brakes of the vehicle 117. At block 113, the operation of the vehicle 117 is controlled based on the control commands to the one or more actuators.

Figure 1E:
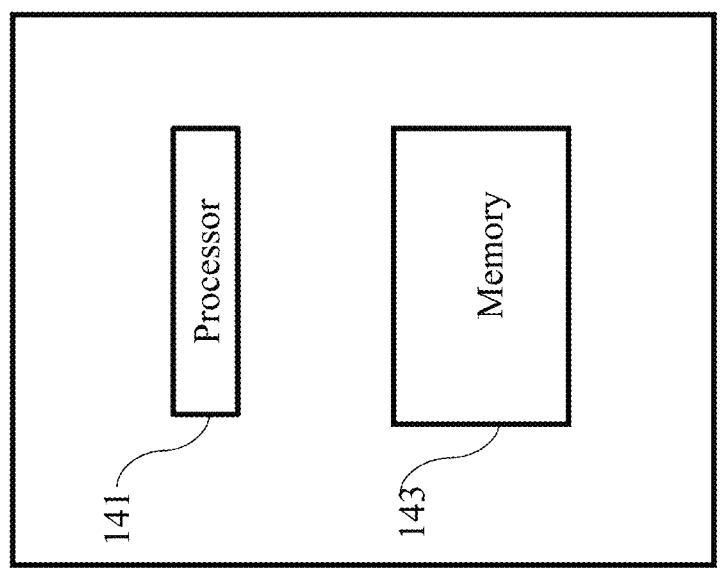
FIG. 1E shows a block diagram of a controller for controlling the operation of the vehicle, according to some embodiments of the present disclosure.

The steps (101-113) described in the block diagram 100 for controlling the operation of the vehicle 117 are executed by a controller. FIG. 1E shows a block diagram of a controller 139 for controlling the operation of the vehicle 117, according to some embodiments of the present disclosure. The controller 139 includes a processor 141 and a memory 143. The processor 141 may be a single core processor, a multi-core processor, a computing cluster, or any number of other configurations. The memory 143 may include random access memory (RAM), read only memory (ROM), flash memory, or any other suitable memory systems. Additionally, in some embodiments, the memory 143 may be implemented using a hard drive, an optical drive, a thumb drive, an array of drives, or any combinations thereof.

Figure 2:
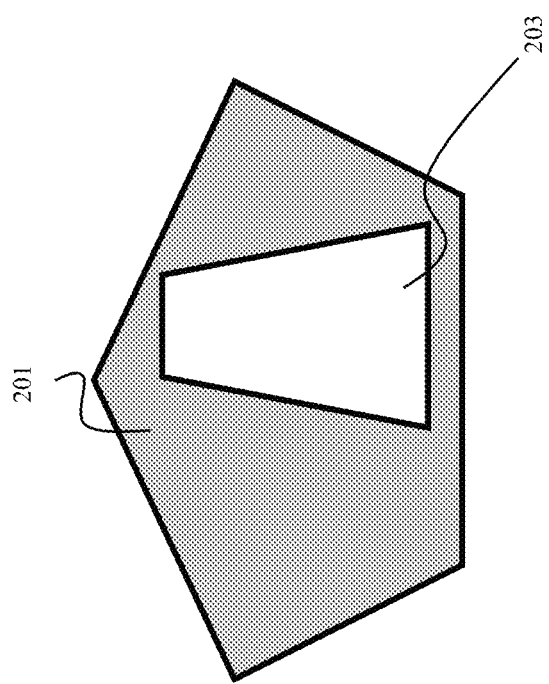
FIG. 2 illustrates a relationship between a chance constraint and a deterministic constraint, according to some embodiments of the present disclosure.

FIG. 2 illustrates a relationship between sets of values for the decision variables z that satisfy the chance constraint (1) and the deterministic constraint (6), according to some embodiments of the present disclosure. Here, a set 201 denotes a set of values for the decision variable z that satisfies chance constraint (1). Since the uncertainty is unknown, the set 201 is unknown. However, using the data-driven approach described in FIG. 1C, a tighter set 203 that is a strict subset of the set 201 can be determined. Formally, every value of the decision variable that belongs to the tighter set 203 also belongs to the set 201, i.e., every value of the decision variable that satisfies (6) also satisfies (1).

According to an embodiment, the chance constraint (1), when linear in w, can be reformulated into the deterministic constraint (6) using half-spaces. Consider an example of driving the vehicle 117 to stay within a speed limit. Here, the chance constraint (1) where f has a specific form, $$f(z, w) = V(z) + w - SpeedLimit. \quad (8)$$

Here, the decision variable z, may be a collection of thrust output of engine of the vehicle 117, steering angle, and the like, V(z) describes the estimated speed of the vehicle 117 as a known nonlinear transformation of the decision variable z, and the uncertainty w is a difference between an estimated speed of the vehicle 117 and a true speed of the vehicle 117. Here, w is a complex object whose uncertainty distribution is difficult to obtain in practice.

Some embodiments are based on the realization that data on w can be collected separately. For example, by driving the vehicle 117 on a test track equipped with a speed estimator like Doppler radar, one can obtain the true speed of the vehicle 117 and estimate w for different road conditions, steering conditions, and the like.

It may be observed that the chance constraint (1), where f is affine in the uncertainty (similarly to (7)), can be considered as a special case of the constraint set/function f, $$C = \{z \in \mathcal{S}: \mathbb{P}_w\{w_i \leq z_i\} \geq \delta_i, \forall\, i \in [1, N]\} \quad (9)$$

including N different chance constraints of the form (1) with structure assumed in (9). Here, $\mathcal{C}$ is a set of known, deterministic constraints on the decision variable z.

Given M samples of the decision variables, it can be shown using (4) that $$\bigcap_{i \in [1,N]} \{z \in \mathcal{S}: \hat{Q}^M_w(\Delta_i^+) \leq z_i\} \subseteq C \subseteq \bigcap_{i \in [1,N]} \{z \in \mathcal{S}: \hat{Q}^M_w(\Delta_i^-) \leq z_i\} \quad (10a)$$

hold with confidence 1−β with $$\Delta_i^+ = \delta_i + \sqrt{\frac{\ln(N) + \ln(1/\beta)}{2M}} \quad (10b)$$

$$\Delta_i^- = \delta_i - \sqrt{\frac{\ln(N) + \ln(1/\beta)}{2M}} \quad (10c)$$

Consequently, an inner- and outer-approximation to the constraint set in (8) can be computed using the collected samples. In practice, β is set to be very small (for example, $10^{-6}$). Here, $\mathcal{C}$ coincides with the set 201 in FIG. 2, while the Left Hand Side (LHS) of (10a) coincides with the set 203 in FIG. 2.

Thus, the constraint (1) with the f of the form (8) can be enforced using the M samples of the uncertainty w as follows, $$V(z) + \hat{Q}^M_w(\Delta^+) - SpeedLimit \leq 0. \quad (11)$$

Here, the tightening $\hat{Q}_w^M(\Delta^+)$ is computed using the collected samples and the user-specified risk threshold δ.

Figure 3:
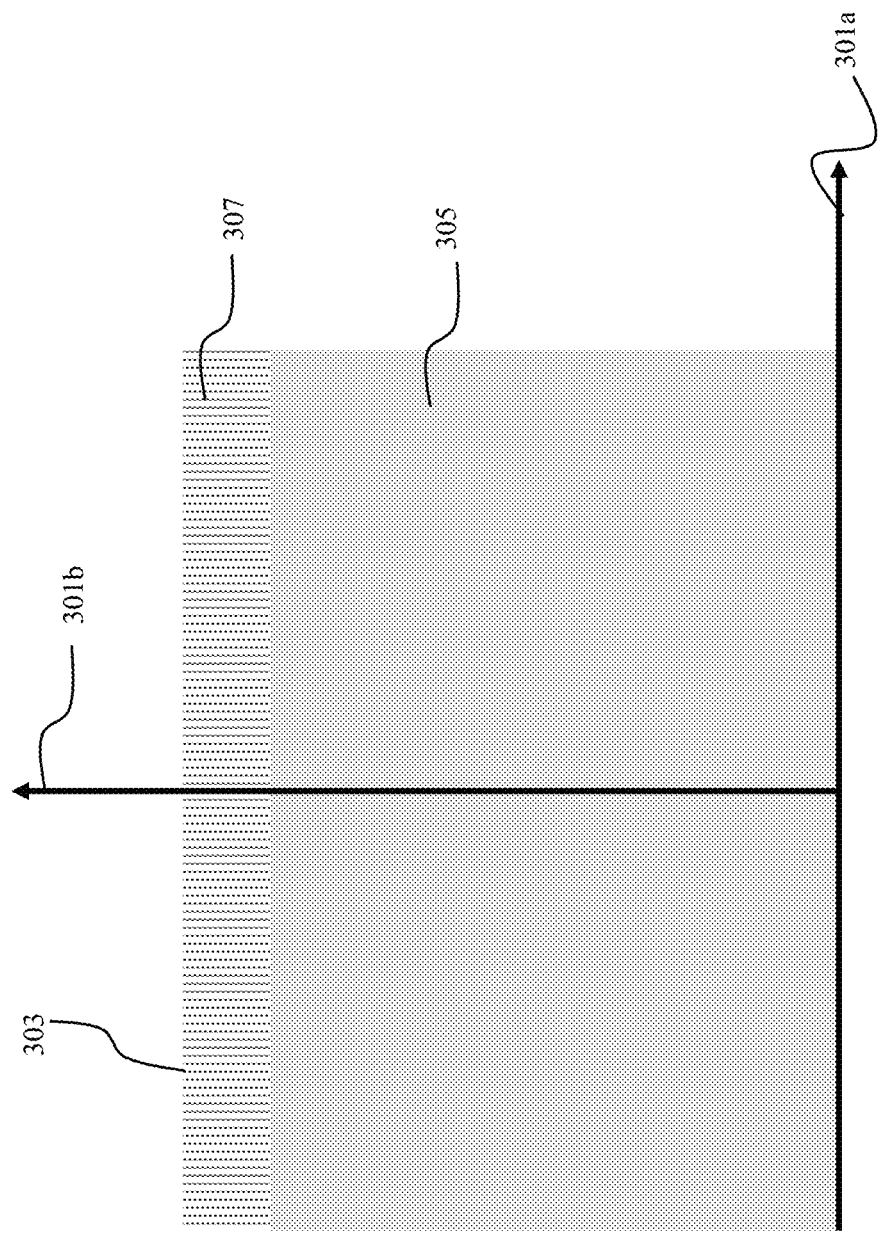
FIG. 3 illustrates an exemplar reformulation of the chance constraint using half-spaces, according to some embodiments of the present disclosure.

FIG. 3 illustrates an exemplar reformulation of the chance constraint using halfspaces, according to some embodiments of the present disclosure. Axis 301a and axis 301b denote permissible lateral and longitudinal speeds allowed for the vehicle 117, respectively. The speed limit constraint limits the longitudinal speed at 303 without any restriction on the lateral speed. The chance constraint reformulation using M samples and (10a) tightens the speed limit constraint further to a region 305, where a region 307 is removed from a set of possible longitudinal speeds to enforce (1).

In some embodiments, the uncertainty set ε is defined using an ellipsoid or a union of ellipsoids. In either of these cases, a second-order cone programming or semi-definite programming may be used to enforce the constraint (6) when f is a (possibly non-convex) quadratic function without resorting to the bilevel optimization.

In an embodiment, the uncertainty set is determined based on the empirical quantile function bounded by the confidence bounds, the user-specified risk threshold, and a user-specified template set. In some embodiments, the uncertainty set is an affine transformation of the user-specified template set in a space of uncertainty. A shape of the user-specified template set is one of a halfspace, a polytope, a hypersphere, a hyperellipsoid, a zonotope, a convex shape, and a non-convex shape. For instance, the determination of the uncertainty set ε can be achieved via optimization or binary search of a scaling of the user-specified template set until the desired probability threshold is met. Specifically, the uncertainty set ε is defined as ε= $\mathcal{V}$(t), where $\mathcal{V}$(t)={w: h(w)≤t} is the user-specified template set for some real-valued function h, and t solves the following optimization problem, $$\text{minimize } t, \quad (12)$$
$$\text{subject to } \mathbb{P}\{w \in \mathcal{V}(t)\} \geq \delta.$$

For different choices of function h, different uncertainty sets can be constructed. Examples of the function h include continuous functions such as polynomials, and transcendental functions. To obtain a convex uncertainty set, the function h can be restricted to quasiconvex functions, which are functions whose sublevel sets are convex. The optimization problem (12) has a closed-form expression $t^* = Q_{h(w)}(\delta)$. Specifically, for $t^* < 1$, (12) scales down the set $\mathcal{V}$(1), while for $t^* > 1$, (12) scales up the set $\mathcal{V}$(1), and choice of $t^*$ is made to ensure that $\mathbb{P}\{w \in \mathcal{V}(t^*)\} \geq \delta$ while making $t^*$ as small as possible. In such a manner, the user-specified template set $\mathcal{V}$(t) is scaled based on the empirical quantile function, the user-specified template set, and the user-specified risk threshold, to determine the uncertainty set ε.

Since the true quantile function is unknown, (10c) is used and $t^* = \hat{Q}_{h(w)}(\Delta^+)$ is defined to obtain the scaling using the samples and the empirical quantile function. In an embodiment, $\Delta^+$ is chosen to be conservative in the choice of the uncertainty set.

According to an embodiment, a linear chance constraint can be transformed into the deterministic constraint, by the processor 141, by using the halfspace as the uncertainty set. The halfspace is based on a pre-determined normal vector and a parameter determining a shift in the halfspace. For instance, equations (8), (9), (10), and (11) can be cast, for a generic linear chance constraint $\mathbb{P}_w\{p(z)+c^T w \leq 0\} \geq \delta$ for any function p and vector c in the context of (12), for example, as $f(z,w)=p(z)+c^T w$. For such a chance constraint, the function h is defined as $h(w)=c^T w$, t and the template set $\mathcal{V}$(t)={w:$c^T w \leq t$} is the halfspace with the pre-determined normal vector c and parameter t determining the shift in the halfspace. Consequently, by solving (12), the uncertainty set ε= $\mathcal{V}(t^*)$={v∈ $\mathcal{W}$:$c^T v \leq \hat{Q}_{c^T w}^M(\Delta^+)$}, and $g(z)=p(z)+\hat{Q}_{c^T w}^M(\Delta^+)$ are obtained.

In an alternate embodiment, the uncertainty set is an ellipsoidal uncertainty set, i.e., the uncertainty set of an ellipsoid shape. In such an embodiment, a quadratic $h(w)=(w-c)^T S^{-1}(w-c)=w^T S^{-1} w - 2c^T S^{-1} w + c^T S^{-1} c$ is defined for a p-dimensional uncertainty w with a user-defined vector $c \in \mathbb{R}^p$ and a positive semi-definite matrix $S \in \mathbb{R}^{p \times p}$, and the template set $\mathcal{V}(t)=\{w:(w-c)^T S^{-1}(w-c) \leq t\}$ is a family of ellipsoids. The optimization problem (12) has a closed form expression $t^* = \hat{Q}_{h(w)}(\Delta^+)$. Specifically, (12) scales an ellipsoid $\mathcal{V}/(1)$ centered at c until probability threshold requirement $\mathbb{P}\{w \in \mathcal{V}(t)\} \geq \delta$ is met.

Figure 4A:
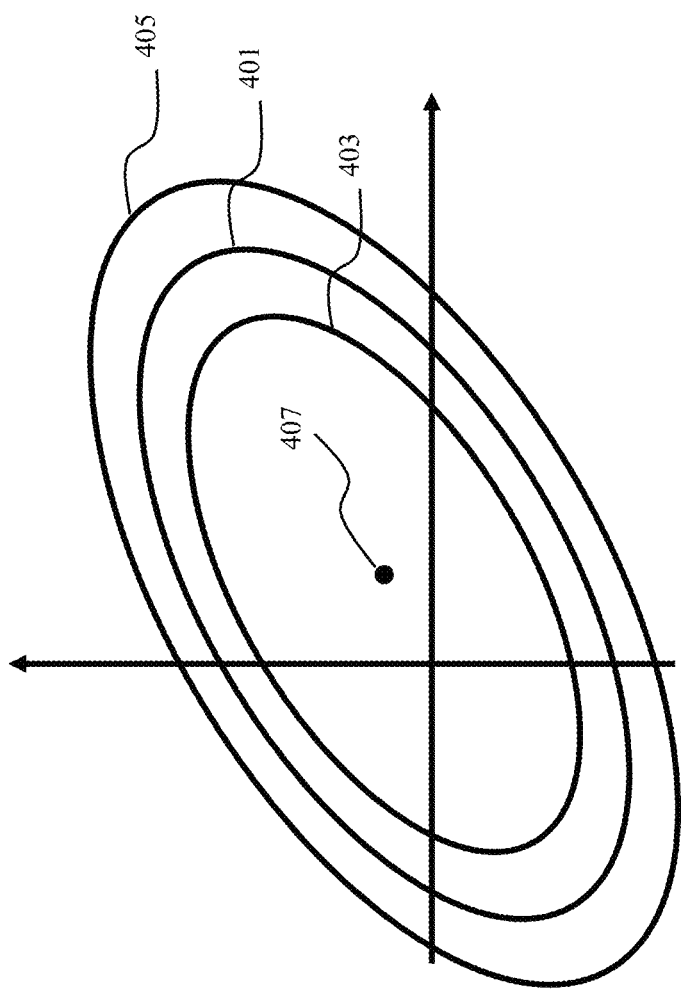
FIG. 4A illustrates a family of ellipsoids obtained by scaling a user-specified ellipsoidal template set, according to some embodiments of the present disclosure.

FIG. 4A illustrates a family of ellipsoids $\mathcal{V}(t)$ such as, an ellipsoid 401, an ellipsoid 403, and an ellipsoid 405 (which are collectively referred to hereinafter as the ellipsoids 401, 403, and 405), characterized by a specific value of c (point 407) and S for different values of t for p=2, according to some embodiments of the present disclosure. The ellipsoid 401 corresponds to ellipsoid $\mathcal{V}(1)$. By design, the ellipsoids 401, 403, and 405 are nested, and ellipsoids corresponding to smaller values of t are contained in ellipsoids corresponding to larger value of t. For example, the ellipsoid 403 corresponds to $\mathcal{V}(t_1)$ and the ellipsoid 405 corresponds to $\mathcal{V}(t_2)$ with $t_1 < t_2$ and the ellipsoid 403 is contained in the ellipsoid 405.

Figure 4B:
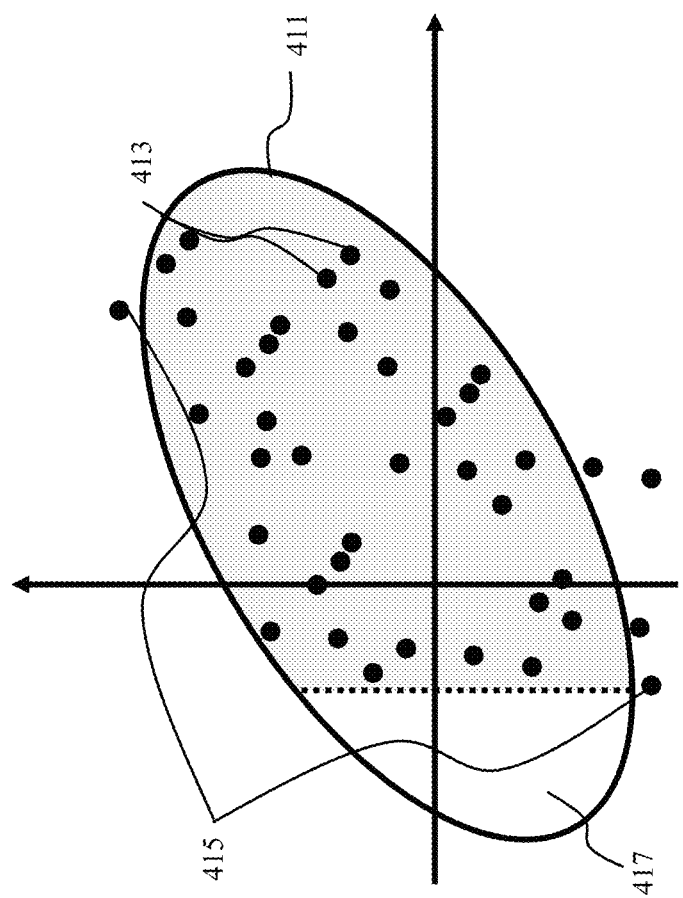
FIG. 4B illustrates determination of an uncertainty set using an ellipsoid, according to some embodiments of the present disclosure.

FIG. 4B illustrates an ellipsoid 411, where the uncertainty set ε includes data samples 413 and excludes data samples 415, according to some embodiments of the present disclosure. The shape of the ellipsoid 411 forces the uncertainty set ε to contain a region 417 that does not include any data samples.

FIG. 4C illustrates construction of a union of a predetermined number of ellipsoids $\varepsilon_i$ 419, 421, and 423 that together achieve the probability mass of δ, according to some embodiments of the present disclosure. The union of ellipsoids 419, 421, and 423 may be computed via machine learning techniques like clustering where a set of samples $\mathcal{W}=\{w_{sample}^{(1)}, w_{sample}^{(2)}, \ldots w_{sample}^{(M)}\}$ is partitioned into a pre-determined number of groups $\mathcal{W}_i$ such that $\cup_i \mathcal{W}_i = \mathcal{W}$ and sets $\mathcal{W}_i$ are pairwise disjoint. Subsequently, separate empirical quantile functions are computed using the samples from each one of the groups and solve (12) to compute the ellipsoid $\varepsilon_i$. The use of the union of ellipsoids may permit a more tighter formulation containment of the data samples as compared to a single ellipsoid, e.g., the ellipsoid 411. Further, it may be observed that $$\max_{w \in \cup_i \varepsilon_i} f(z, w) = \max_i \{\max_{w \in \varepsilon_i} f(z, w)\}. \tag{13}$$

Consequently, (6) can be expressed as a collection of i constraints of the form $\max_{w \in \varepsilon_i} f(z, w) \leq 0$.

Additionally, according to some embodiments, quadratic chance constraints can be reformulated using the ellipsoidal uncertainty set obtained by scaling, based on the empirical quantile function, the user-specified template set. The quadratic chance constraints are chance constraints where f is quadratic in the decision variable z and the uncertainty w. Referring back to FIG. 1B, the quadratic chance constraints arise when designing motion trajectory 125b for the vehicle 117 where the obstacles 121a, 121b, and 121c faced by the vehicle 117 are desired to be bounded using ellipsoids instead of the bounding boxes 123a, 123b, and 123c.

Additionally or alternatively, for the case of quadratic chance constraints, it may be observed that $\max_{w \in \varepsilon} f(z, w)$ can be evaluated for an ellipsoidal ε using S-lemma. Specifically, the S-lemma enables to cast the deterministic constraint $\max_{w \in \varepsilon} f(z, w) \leq 0$ as a constraint in a semi-definite cone, i.e., require symmetric matrices constructed using functions solely of z, f, and h have non-negative eigenvalues. Such a reformulation enables use of off-the-shelf solvers when solving chance constrained optimization problems with the quadratic chance constraints, without resorting to solving the bilevel optimization problem. In such a manner, the quadratic chance constraints are reformulated into the deterministic constraints based on the S-lemma.

Additionally or alternatively, in some embodiments, different types of template sets including hyperspheres, polytopes, zonotopes, and general convex and non-convex sets, may also be considered by varying the choice of the function h in the definition of $\mathcal{V}(t)$, with more general forms of the constraint function f.

To that end, according to an embodiment, a generic non-convex chance-constrained optimization problems of the form $$\text{minimize } J(z), \tag{14a}$$
$$\text{subject to } z \in \mathcal{Z},$$
$$\forall i \in [1, N], \mathbb{P}\{f_i(z, w) \leq 0\} \geq \delta_i,$$

can be cast as a deterministic, bilevel optimization problem, $$\text{minimize } J(z), \tag{14b}$$
$$\text{subject to } z \in \mathcal{Z},$$
$$\forall i \in [1, N], \max_{w \in \varepsilon} f_i(z, w) \leq 0,$$

which is then reformulated into the deterministic optimization problem, $$\text{minimize } J(z), \tag{14c}$$
$$\text{subject to } z \in \mathcal{Z},$$
$$\forall i \in [1, N], g_i(z) \leq 0.$$

Using the empirical quantile functions, some embodiments of the presented disclosure provide a principled approach to convert realizations of the uncertainty w and the constraint function $f_i$ and probability threshold $\delta_i$ into a deterministic constraint $g_i(z) \leq 0$. The key advantage of such a reformulation is that (14c) can be solved using off-the-shelf nonlinear optimization solvers. Additionally, similarly to (9) and (10), we can use (6) to tighten the chance constraint in (14a) to ensure that every feasible solution of (14c) is also feasible for (14a).

Figure 5A:
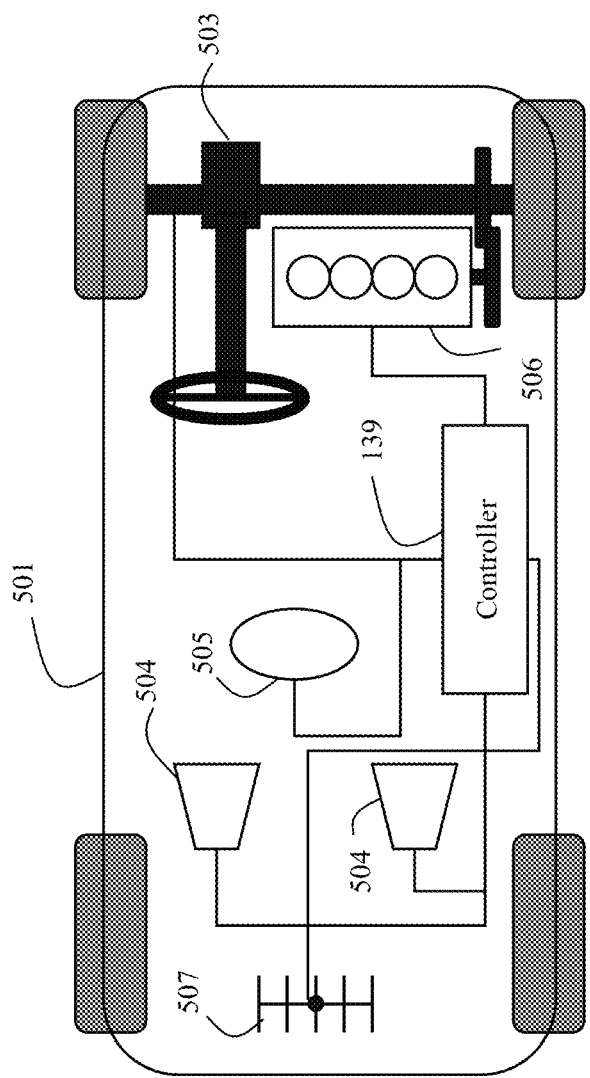
FIG. 5A shows a schematic of a vehicle including the controller for controlling the vehicle, according to some embodiments of the present disclosure.

FIG. 5A shows a schematic of a vehicle 501 including the controller 139, according to some embodiments of the present disclosure. As used herein, the vehicle 501 can be any type of wheeled vehicle, such as a passenger car, bus, or rover. Also, the vehicle 501 can be an autonomous or semi-autonomous vehicle. For example, some embodiments control the motion of the vehicle 501. Examples of the motion include lateral motion of the vehicle 501 controlled by a steering system 503 of the vehicle 501. In one embodiment, the steering system 503 is controlled by the controller 139. Additionally or alternatively, the steering system 503 can be controlled by a driver of the vehicle 501.

The vehicle 501 may include an engine 506, which can be controlled by the controller 139 or by other components of the vehicle 501. The vehicle 501 may also include one or more sensors 504 to sense the surrounding environment. Examples of the sensors 504 include distance range finders, radars, lidars, and cameras.

The vehicle 501 can also include one or more sensors 505 to sense its current motion quantities and internal status. Examples of the sensors 505 include global positioning system (GPS), accelerometers, inertial measurement units, gyroscopes, shaft rotational sensors, torque sensors, deflection sensors, pressure sensor, and flow sensors. The sensors provide information to the controller 139. The vehicle can be equipped with a transceiver 507 enabling communication capabilities of the controller 139 through wired or wireless communication channels.

Figure 5B:
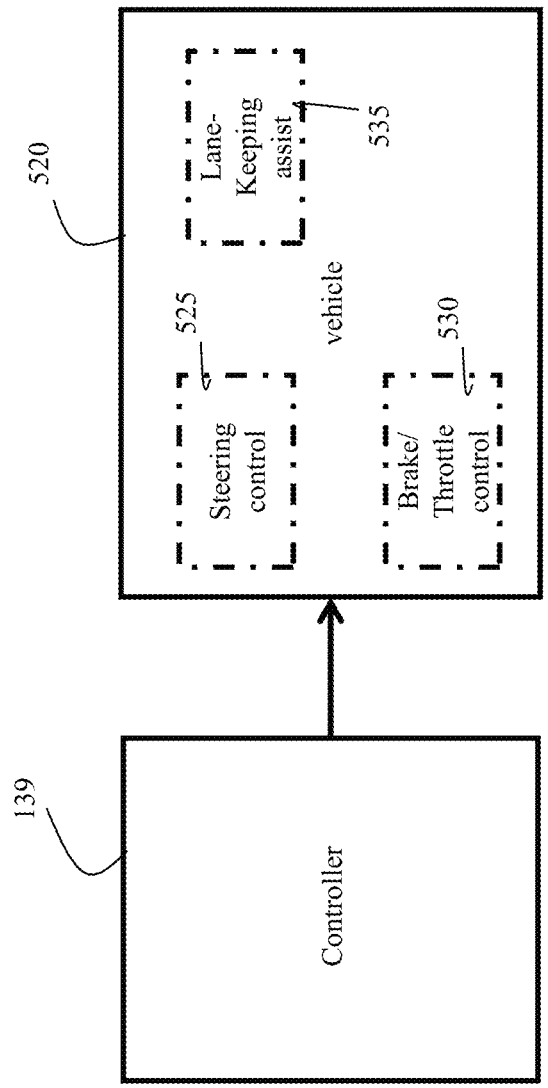
FIG. 5B shows a schematic of interaction between the controller and controllers of the vehicle, according to some embodiments of the present disclosure.

FIG. 5B shows a schematic of interaction between the controller 139 and controllers 520 of the vehicle 501, according to some embodiments. For example, in some embodiments, the controllers 520 of the vehicle 501 are steering controller 525 and brake/throttle controllers 530 that control rotation and acceleration of the vehicle 501. In such a case, the controller 139 outputs control commands to the controllers 525 and 530 to control a state of the vehicle 501 such as acceleration, orientation, and the like, for controlling motion of the vehicle 501. The controllers 520 can also include high-level controllers, e.g., a lane-keeping assist controller 535 that further process the control commands of the controller 139. In both cases, the controllers 520 maps use the control commands of the controller 139 to control at least one actuator of the vehicle 501, such as the steering wheel and/or the brakes of the vehicle 501, in order to control the motion of the vehicle 501.

Figure 5C:
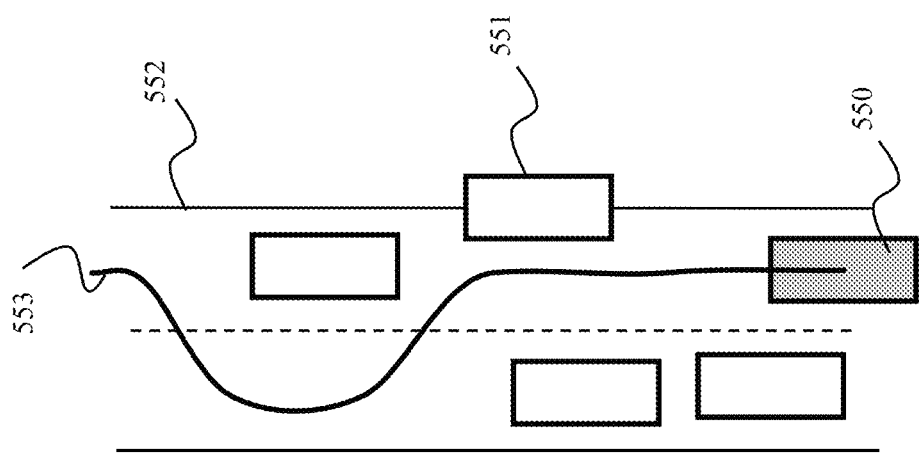
FIG. 5C shows a schematic of a motion planning for the vehicle, according to some embodiments of the present disclosure.

FIG. 5C shows a schematic of an autonomous or semi-autonomous vehicle 550 controlled by the controller 139, for which control commands are computed by using principles of some embodiments. The controller 139 controls the controlled vehicle 550 to keep the controlled vehicle 550 within particular bounds of road 552, and aims to avoid other uncontrolled vehicles, i.e., obstacles 551 for the controlled vehicle 550. For such controlling, the controller 139 determines the control commands by solving the optimal control problem subject to the deterministic constraint (6). In some embodiments, the control commands include commands specifying values of one or combination of a steering angle of wheels of the controlled vehicle 550, a rotational velocity of the wheels, and an acceleration of the controlled vehicle 550. The control commands may, for example, cause the controlled vehicle 550 to navigate along a trajectory 553, without colliding the uncontrolled vehicles 551 (obstacles).

Figure 6:
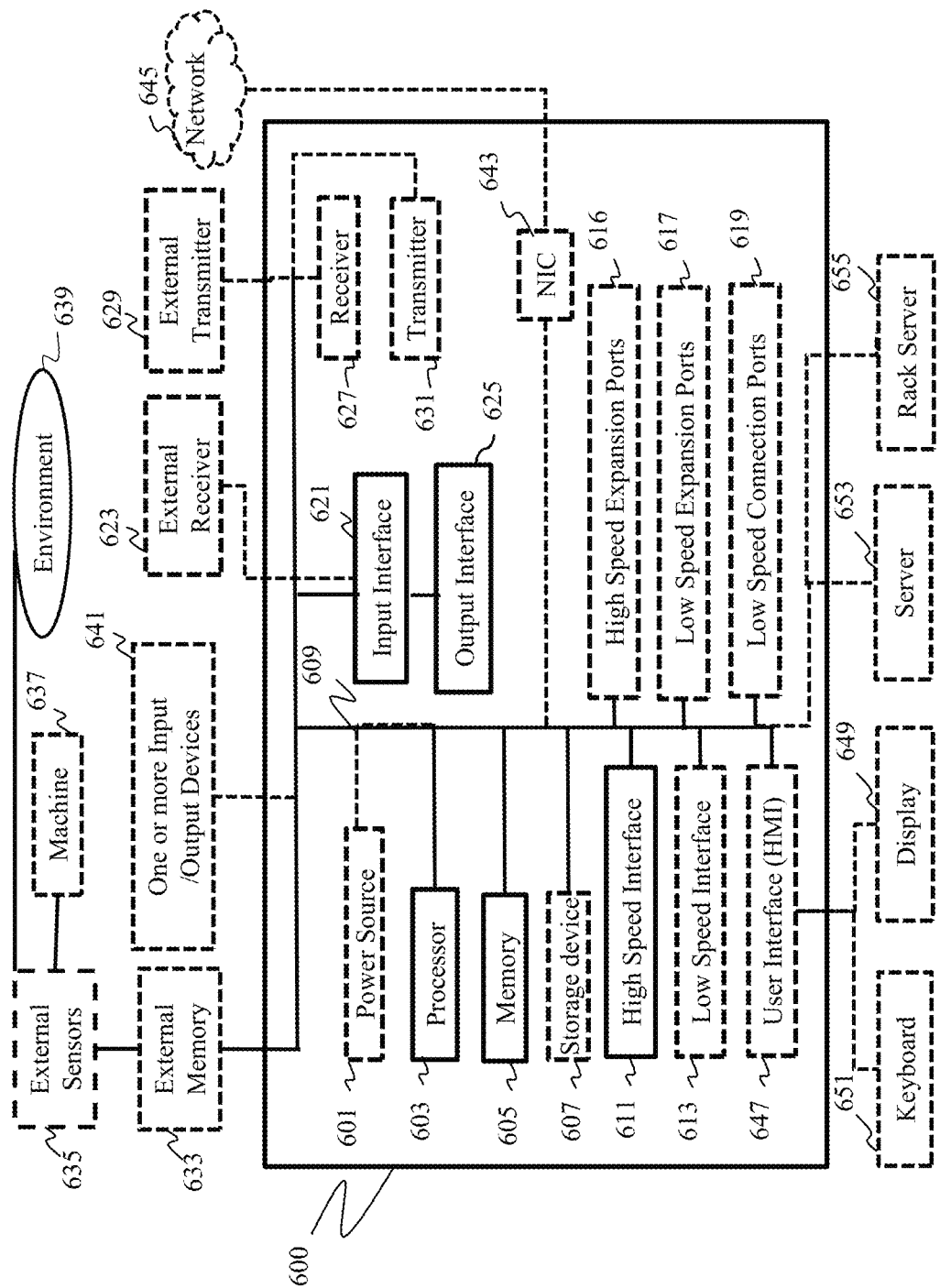
FIG. 6 is a schematic diagram illustrating a computing device that can be used for implementing the controller and methods of the present disclosure.

FIG. 6 is a schematic illustrating a computing device 600 for implementing the methods and the controller of the present disclosure. The computing device 600 includes a power source 601, a processor 603, a memory 605, a storage device 607, all connected to a bus 609. Further, a high-speed interface 611, a low-speed interface 613, high-speed expansion ports 616 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computer device 600.

The memory 605 can store instructions that are executable by the computer device 600 and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 647, and to the keyboard 651 and the display 649 (e.g., through a graphics processor or accelerator), and to the high-speed expansion ports 616, which may accept various expansion cards via the bus 609. In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus.

Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an operation of a system subject to an uncertainty of an operation variable of the system, the controller comprising: at least one processor; and a non-transitory memory having instructions stored thereon that, when executed by the at least one processor, cause the feedback controller to:
    collect a number of samples of the uncertainty of the operation variable;
    construct, based on the collected samples, an empirical quantile function associated with the uncertainty of the operation variable;
    determine confidence bounds on the empirical quantile function to bound an approximation error between the empirical quantile function and a true quantile function;
    determine an uncertainty set based on the empirical quantile function bounded by the confidence bounds and a user-specified risk threshold;
    reformulate, based on the uncertainty set, a chance constraint into a deterministic constraint;
    solve an optimal control problem subject to the deterministic constraint to produce one or more control commands to one or more actuators of the system; and
    control the operation of the system based on the control commands to the one or more actuators of the system.

2. The controller of claim 1, wherein the processor is further configured to determine the confidence bounds on the empirical quantile function, based on Dvoretzky-Kiefer-Wolfowitz-Massart inequality.

3. The controller of claim 1, wherein the chance constraint constraints a probability of a nonlinear function of a decision variable be non-positive with the user-specified risk threshold, and wherein the nonlinear function is one of a non-convex and a polynomial.

4. The controller of claim 1, wherein, to determine the uncertainty set based on the empirical quantile function bounded by the confidence bounds and the user-specified risk threshold, the processor is further configured to scale a user-specified template set, based on the empirical quantile function, the user-specified template set, and the user-specified risk threshold.

5. The controller of claim 1, wherein the uncertainty set is an affine transformation of a user-specified template set in a space of uncertainty, and wherein a shape of the user-specified template set is one of a halfspace, a polytope, a hypersphere, a hyperellipsoid, a zonotope, a convex shape, and a non-convex shape.

6. The controller of claim 1, wherein the uncertainty set is a halfspace based on a pre-determined normal vector and a parameter determining a shift in the halfspace, and wherein the processor is further configured to reformulate a linear chance constraint into the deterministic constraint based on the halfspace.

7. The controller of claim 1, wherein the processor is further configured to reformulate a quadratic chance constraint into the deterministic constraint based on an ellipsoidal uncertainty set, and wherein the ellipsoidal uncertainty set is obtained by scaling, based on the empirical quantile function, a user-specified template set.

8. The controller of claim 1, wherein the processor is further configured to reformulate a quadratic chance constraint into the deterministic constraint based on S-lemma that enables to cast the deterministic constraint as a constraint in a semi-definite cone.

9. The controller of claim 1, wherein the operation variable of the system correspond to a position of a bounding around an obstacle.

10. The controller of claim 1, wherein the samples of the uncertainty of the operation variable are determined offline.

11. The controller of claim 1, wherein the uncertainty of an operation variable of the system and the true quantile function are unknown.

12. The controller of claim 1, wherein the system is one of an autonomous ground vehicle or an unmanned aerial vehicle.

13. The controller of claim 12, wherein the processor is further configured to submit the control commands to one or more actuators of the autonomous ground vehicle, and wherein the control commands cause the autonomous ground vehicle to navigate along a trajectory without colliding one or more obstacles.

14. The controller of claim 13, wherein the control commands to the one or more actuators of the autonomous ground vehicle include values of one or combination of a steering angle of wheels of the autonomous ground vehicle, a rotational velocity of the wheels, and an acceleration of the autonomous ground vehicle.

15. A method for controlling an operation of a system subject to an uncertainty of an operation variable of the system, comprising:

collecting a number of samples of the uncertainty of the operation variable;

constructing, based on the collected samples, an empirical quantile function associated with the uncertainty of the operation variable;

determining confidence bounds on the empirical quantile function to bound an approximation error between the empirical quantile function and a true quantile function;

determining an uncertainty set based on the empirical quantile function bounded by the confidence bounds and a user-specified risk threshold;

reformulating, based on the uncertainty set, a chance constraint into a deterministic constraint;

solving an optimal control problem subject to the deterministic constraint to produce one or more control commands to one or more actuators of the system; and controlling the operation of the system based on the control commands to the one or more actuators of the system.

16. The method of claim 15, wherein the method further comprises determining the confidence bounds on the empirical quantile function, based on Dvoretzky-Kiefer-Wolfowitz-Massart inequality.

17. The method of claim 15, wherein, to determine the uncertainty set based on the empirical quantile function bounded by the confidence bounds and the user-specified risk threshold, the method further comprises scaling a user-specified template set, based on the empirical quantile function, the user-specified template set, and the user-specified risk threshold.

18. The method of claim 15, wherein the uncertainty set is a halfspace based on a pre-determined normal vector and a parameter determining a shift in the halfspace, and wherein the method further comprises reformulating a linear chance constraint into the deterministic constraint based on the halfspace.

19. The method of claim 15, wherein the system is one of an autonomous ground vehicle or an unmanned aerial vehicle.

20. A non-transitory computer-readable storage medium embodied thereon a program executable by a processor for performing a method for controlling an operation of a system subject to an uncertainty of an operation variable of the system, the method comprising:

collecting a number of samples of the uncertainty of the operation variable;

constructing, based on the collected samples, an empirical quantile function associated with the uncertainty of the operation variable;

determining confidence bounds on the empirical quantile function to bound an approximation error between the empirical quantile function and a true quantile function;

determining an uncertainty set based on the empirical quantile function bounded by the confidence bounds and a user-specified risk threshold;

reformulating, based on the uncertainty set, a chance constraint into a deterministic constraint;

solving an optimal control problem subject to the deterministic constraint to produce one or more control commands to one or more actuators of the system; and controlling the operation of the system based on the control commands to the one or more actuators of the system.

* * * * *